(12) United States Patent
Zhang et al.

(10) Patent No.: US 9,121,479 B2
(45) Date of Patent: Sep. 1, 2015

(54) CYCLOIDAL PINWHEEL SPEED REDUCER

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventors: Cheng Zhang, Shenzhen (CN); Xiao-Ming Xu, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

(*) Notice: Subject to any disclaimer, the term of this patent is extended or adjusted under 35 U.S.C. 154(b) by 0 days.

(21) Appl. No.: 14/186,800

(22) Filed: Feb. 21, 2014

(65) Prior Publication Data

US 2014/0256496 A1 Sep. 11, 2014

(30) Foreign Application Priority Data

Mar. 7, 2013 (CN) .......................... 2013 1 0072807

(51) Int. Cl.
- F16H 1/46 (2006.01)
- F16H 1/32 (2006.01)
- F16H 35/00 (2006.01)
- F16H 1/36 (2006.01)

(52) U.S. Cl.
CPC *F16H 1/46* (2013.01); *F16H 1/321* (2013.01); *F16H 1/36* (2013.01); *F16H 2001/325* (2013.01); *F16H 2035/001* (2013.01)

(58) Field of Classification Search
USPC .................. 475/162, 168, 176, 178, 207, 219
See application file for complete search history.

(56) References Cited

U.S. PATENT DOCUMENTS

| | | | | |
|---|---|---|---|---|
| 5,286,235 | A * | 2/1994 | Gerat | 475/162 |
| 8,663,049 | B1 * | 3/2014 | Yao | 475/178 |
| 2002/0052262 | A1 * | 5/2002 | Lim | 475/179 |
| 2004/0198543 | A1 * | 10/2004 | Christ | 475/163 |

* cited by examiner

*Primary Examiner* — Derek D Knight
*Assistant Examiner* — Timothy M Hannon
(74) *Attorney, Agent, or Firm* — Novak Druce Connolly Bove + Quigg LLP

(57) ABSTRACT

A cycloid pinwheel speed reducer includes a first housing, two cycloidal gears, a plurality of rollers, an output shaft, a second housing, a mounting frame, an input gear, a transmission gear, and a first transmission shaft. The mounting frame includes a mounting portion, a first eccentric portion, and a second eccentric portion. The cycloidal gears are respectively sleeved on the first eccentric portion and the second eccentric portion. The second housing is sleeved on the mounting portion. The rollers are sandwiched between the second housing and the cycloidal gears. The transmission gear is rotatably mounted within the mounting portion and sleeved on the first transmission shaft, and meshes with the input gear and the first housing.

17 Claims, 3 Drawing Sheets

CYCLOIDAL PINWHEEL SPEED REDUCER

BACKGROUND

1. Technical Field

The present disclosure relates to speed reducers, particularly to a cycloidal pinwheel speed reducer.

2. Description of Related Art

A cycloidal pinwheel speed reducer may include an input shaft mounted on a frame by a bearing. The input shaft includes an eccentric shaft, and is assembled with two cycloidal gears by the eccentric shaft. The two cycloidal gears are respectively connected to an output shaft. The eccentric shaft rotates the cycloidal gears, and the cycloidal gears rotate the output shaft. However, when in use, each cycloidal gear simultaneously rotates around its own axis and an additional axis, a high rotation concentricity of the cycloidal pinwheel speed reducer is needed to achieve a stable transmission. However, in order to achieve a high transmission ratio, the cycloidal gears may be used in a second transmission stage, and the input shaft is used to output a movement of a first transmission stage. The first transmission stage may affect a rotation concentricity of the input shaft, which reduces the rotation concentricity of the cycloidal pinwheel speed reducer.

Therefore, there is room for improvement in the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one".

Figure 1:
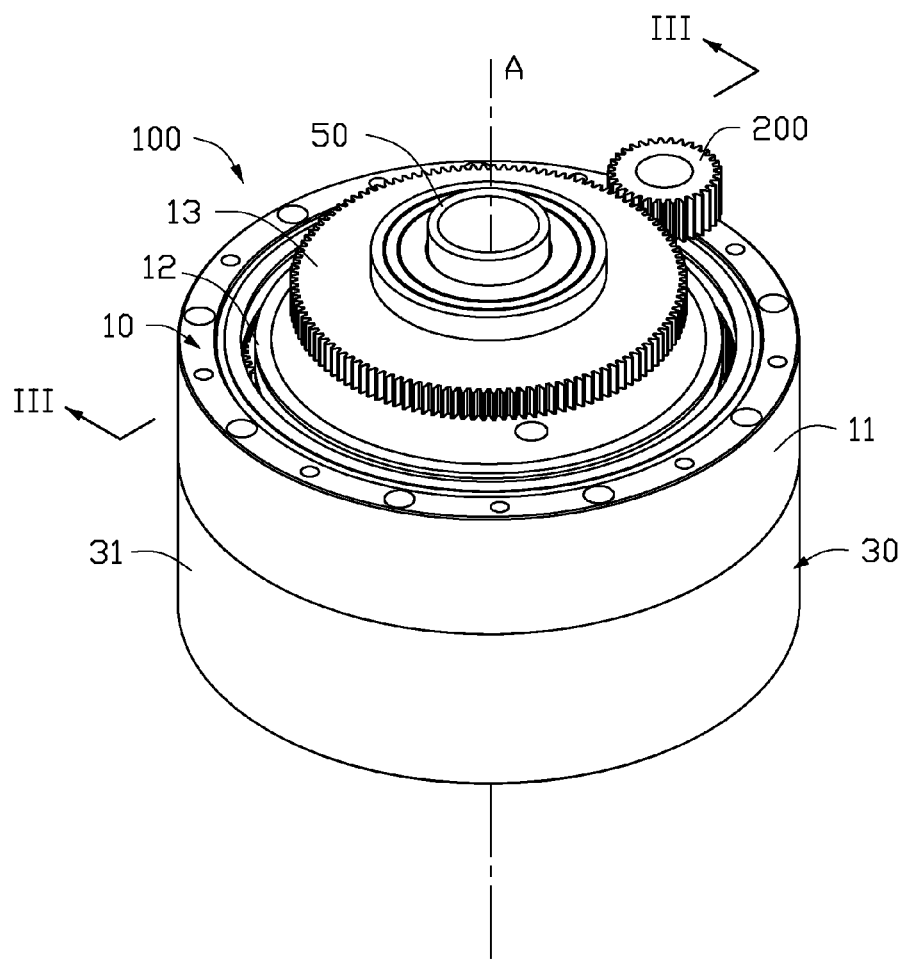
FIG. 1 is an isometric view of an embodiment of a cycloidal pinwheel speed reducer.
Figure 2:
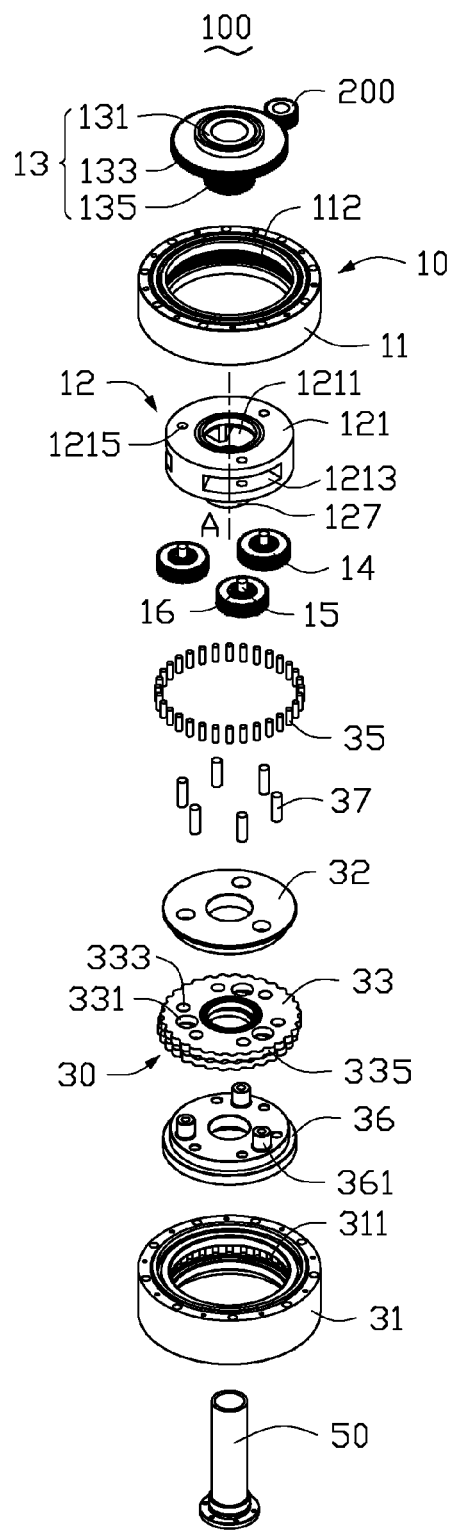
FIG. 2 is an exploded, isometric view of the cycloidal pinwheel speed reducer of FIG. 1.

FIGS. 1 and 2 show an embodiment of a cycloidal pinwheel speed reducer 100. The cycloidal pinwheel speed reducer 100 includes a first transmission assembly 10, a second transmission assembly 30, and a cable receiving tube 50. The second transmission assembly 30 is connected to the first transmission assembly 10. The first transmission assembly 10 is configured to be connected with an outer driver (only a driving gear 200 of the outer driver is shown in FIGS. 1 and 2) to transmit a movement to the second transmission assembly 30. The cable receiving tube 50 is inserted through the first transmission assembly 10 and the second transmission assembly 30, respectively, for receiving cables (not shown).

The first transmission assembly 10 includes a first housing 11, a mounting frame 12, an input gear 13, a transmission gear 14, a first transmission shaft 15, and a needle roller bearing 16. The mounting frame 12 is mounted in the first housing 11, and separated from the first housing 11 by a bearing (not labeled). The input gear 13 and the transmission gear 14 are mounted in the mounting frame 12, and the input gear 13 meshes with the transmission gear 14. The first transmission shaft 15 is inserted into the transmission gear 14, and the needle roller bearing 16 is located between the transmission gear 14 and the first transmission shaft 15. When the input gear 13 is rotated, the transmission gear 14 is driven to rotate around a center axis of the transmission gear 14, and is driven to rotate around a center axis A of the mounting frame 12. The transmission gear 14 further drives the first transmission shaft 15 to rotate around the center axis A of the mounting frame 12. In the illustrated embodiment, a number of the transmission gears 14 is three. A number of the first transmission shafts 15 and a number of the needle roller bearings 16 are three corresponding to the three transmission gears 14.

Figure 3:
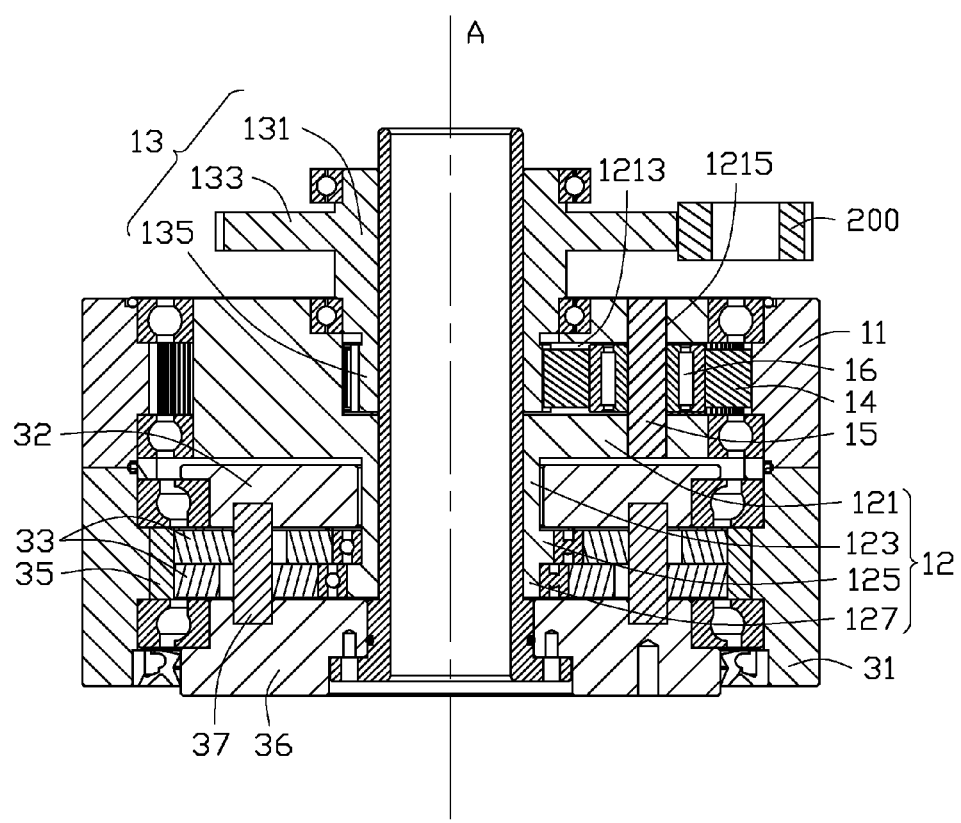
FIG. 3 is a sectional view along a line III-III of the cycloidal pinwheel speed reducer of FIG. 1.

FIG. 3 shows the first housing 11. The first housing 11 is substantially cylindrical, and defines a gear portion 112 at an inner wall, for meshing with the transmission gear 14. The mounting frame 12 is received in the first housing 11, and the center axis A of the mounting frame 12 is overlapping with a center axis of the first housing 11. The mounting frame 12 includes a mounting portion 121, a protruding portion 123, a first eccentric portion 125, and a second eccentric portion 127 connected in that order. The mounting portion 121 is substantially cylindrical, and is received in the first housing 11. A center axis of the mounting portion 121 is the center axis A. The mounting portion 121 defines a first receiving hole 1211 along the center axis A, and three mounting holes 1215 along a direction parallel to the center axis A and arranged around the center axis A. Three second receiving holes 1213 are defined at an outer sidewall of the mounting portion 121 along radial directions thereof. Each mounting hole 1215 passes through the corresponding one of the three second receiving holes 1213. The first receiving hole 1211 is configured to receive the input gear 13. Each second receiving hole 1213 is separated 120 degrees by an adjacent second receiving hole 1213, and communicates with the first receiving hole 1211, for receiving the three transmission gears 14. Each mounting hole 1215 passes through the mounting portion 121, and communicates with the corresponding one of the second receiving holes 1213.

The protruding portion 123 is substantially cylindrical, and protrudes from an end of the mounting portion 121 and is exposed from the first housing 11. A center axis of the protruding portion 123 is also overlapping with the center axis A of the mounting portion 121. The first eccentric portion 125 and the second eccentric portion 127 are located at an end of the protruding portion 123 away from the mounting portion 121. The first eccentric portion 125 protrudes from the protruding portion 123, and is located adjacent to the protruding portion 123. The second eccentric portion 127 protrudes from the first eccentric portion 125, and is located at a side of the first eccentric portion 125 away from the protruding portion 123. A center axis of the first eccentric portion 125 deviates from the center axis of the protruding portion 123. A center axis of the second eccentric portion 127 deviates from the center axis of the protruding portion 123. The center axis of the first eccentric portion 125 is not overlapping with the center axis of the second eccentric portion 127.

The input gear 13 includes a main body 131, a first gear portion 133, and a second gear portion 135. The first gear portion 133 and the second gear portion 135 protrude from opposite ends of the main body 131. The main body 131, the first gear portion 133, and the second gear portion 135 are coaxially arranged, and are coaxially with the mounting frame 12. That is, a center axis of the main body 131, a center axis of the first gear portion 133, and a center axis of the second gear portion 135 are each overlapping with the axis A, respectively. The first gear portion 133 is configured to mesh with the driving gear 200. The second gear portion 135 and a portion of the main body 131 is received in the first receiving hole 1211 of the mounting portion 121. A bearing is positioned between the main body 131 and the mounting portion 121. The second gear portion 135 is configured to mesh with the transmission gears 14.

The three transmission gears 14 are received in the corresponding second receiving holes 1213. A center axis of each transmission gear 14 is aligned with the corresponding mounting hole 1215. The transmission gears 14 mesh with the second gear portion 135 of the input gear 13 and the gear portion 112 of the first housing 11.

The first transmission shaft 15 is inserted into the corresponding mounting hole 1215 and the corresponding transmission gear 14, and opposite ends of the first transmission shaft 15 are fixed to the mounting portion 121. The needle roller bearing 16 is sleeved on the first transmission shaft 15, and received in the corresponding transmission gear 14. When the corresponding transmission gear 14 rotates around the axis A, the first transmission gear 15 rotates the mounting frame 12 around the axis A.

The second transmission assembly 30 includes a second housing 31, a flange 32, two cycloidal gears 33, a plurality of rollers 35, an output shaft 36, and six second transmission shafts 37. The second housing 31 is stacked with the first housing 11, and is coaxial with the first housing 11. The flange 32, the cycloidal gears 33, and the output shaft 36 are stacked in that order, and are received in the second housing 31. The rollers 35 are located between the cycloidal gears 33 and the second housing 31. The second transmission shafts 37 are inserted into the flange 32, the cycloidal gears 33, and the output shaft 36. When the mounting frame 12 rotates, the first eccentric portion 125 and the second eccentric portion 127 rotate the cycloidal gears 33, and then the second transmission shafts 37 rotates the output shaft 36.

The second housing 31 is substantially cylindrical, and is stacked with the first housing 11. A diameter of the second housing 31 is substantially equal to a diameter of the first housing 11. An inner gear ring 311 is defined in an inner sidewall of the second housing 31, for meshing with the rollers 35. The flange 32 is sleeved on the protruding portion 123 of the mounting frame 12, and engaged with the second housing 31 via a bearing sandwiched between the flange 32 and the second housing 31. The flange 32 is located between the mounting portion 121 and the cycloidal gears 33. The cycloidal gears 33 are sleeved on the first eccentric portion 125 and the second eccentric portion 127, respectively. Each cycloidal gear 33 defines three first fixing holes 331 and six second fixing holes 333 along directions parallel to a center axis of the cycloidal gear 33. The first fixing holes 331 are defined to be evenly spaced in the cycloidal gear 33, and arranged 120 degrees apart from each other. The second fixing holes 333 are defined to be evenly spaced in the cycloidal gear 33, and arranged 60 degrees from adjacent fixing holes 333. An outer gear portion 335 is defined at a periphery edge of each cycloidal gear 33. The rollers 35 are received between the outer gear portion 335 and the inner gear ring 311 of the second housing 31, to enable the cycloidal gears 33 to rotate relative to the second housing 31.

The output shaft 36 is substantially a disk, and is located at a side of the cycloidal gears 33 away from the flange 32. Three fixing portions 361 protrude from the output shaft 36. The fixing portions 361 are positioned to be evenly spaced on the output shaft 36, and arranged 120 degrees apart from each other. The fixing portions 361 are aligned with the first fixing holes 331, respectively. Each fixing portion 361 is inserted into the corresponding first fixing hole 331, and inserted into the flange 32. The second transmission shaft 37 is aligned with the second fixing holes 333, and is respectively inserted into the second fixing holes 333. Opposite ends of each transmission shaft 37 are inserted into the flange 32 and the output shaft 36, respectively.

The cable receiving tube 50 is inserted into the input gear 13, the mounting frame 12, and the output shaft 36, and an end of the cable receiving tube 50 adjacent to the output shaft 36 is fixed to the output shaft 36. A center axis of the cable receiving tube 50 is overlapping with the center axis A of the mounting frame 12.

In assembly, an end of the input gear 13 adjacent to the second gear portion 135 is assembled into the first receiving hole 1211 of the mounting frame 12. The needle roller bearing 16 is assembled into the transmission gear 14, and then assembled into the second receiving hole 1213 together with the transmission gear 14. The transmission gear 14 meshes with the second gear portion 135. The first transmission shaft 15 is inserted into the mounting hole 1215, and inserted into the transmission gear 14. The first housing 11 is sleeved on the mounting frame 12, and the transmission gear 14 meshes with the gear portion 112 of the first housing 11. The flange 32 is sleeved on the protruding portion 123 of the mounting frame 12. The cycloidal gears 33 are sleeved on the first eccentric portion 125 and the second eccentric portion 127, respectively. The second transmission shafts 37 are inserted into the second fixing holes 333 of the cycloidal gears 33, and an end of each second transmission shaft 37 is inserted into the flange 32. The fixing portions 361 of the output shaft 36 are inserted into the first fixing holes 331, and then inserted into the flange 32. The second transmission shaft 37 is inserted into the output shaft 36. The rollers 35 are assembled in the outer gear portions 335 of the cycloidal gears 33. The second housing 31 is sleeved on the rollers 35, and the rollers 35 mesh with the inner gear ring 311 of the second housing 31. The cable receiving tube 50 is inserted into the output shaft 36, the mounting frame 12, and the input gear 13, and is fixed to the output shaft 36 by fasteners.

In use, the input gear 13 meshes with the driving gear 200 of the outer driver. The driving gear 200 rotates the input gear 13 around the axis A. Because the second gear portion 135 of the input gear 13 meshes with the transmission gear 14, thus the input gear 13 rotates the transmission gear 14 around the first transmission shaft 15, and simultaneously rotates the transmission gear 14 around the axis A. Because the first transmission shaft 15 is inserted into the transmission gear 14 and the mounting frame 12, the transmission gear 14 rotates the mounting frame 12 around the center axis A driven by the first transmission shaft 15, and then a first stage of power transmission is achieved. The first eccentric portion 125 and the second eccentric portion 127 rotate the cycloidal gears 33. The second transmission shaft 37 rotates the output shaft 36 around the axis A, and then a second stage of power transmission is achieved. Because the first transmission stage of the cycloidal pinwheel speed reducer is a planetary reducer structure, a high rotation concentricity of the cycloidal gears 33 is obtained.

It is believed that the present embodiments and their advantages will be understood from the foregoing description, and it will be apparent that various changes may be made thereto without departing from the spirit and scope of the embodiments or sacrificing all of its material advantages.

What is claimed is:

1. A cycloidal pinwheel speed reducer, comprising:
   a first housing defining a gear portion at an inner wall thereof;

a second housing defining an inner gear ring at an inner sidewall thereof;
a mounting frame comprising a mounting portion received in the first housing, a first eccentric portion and a second eccentric portion, the first eccentric portion connected to the mounting portion, the second eccentric portion connected to the first eccentric portion and located at an axial side of the first eccentric portion away from the mounting portion;
two cycloidal gears received in the second housing, each of the two cycloidal gears comprising an outer gear portion, the two cycloidal gears sleeved on the first eccentric portion and the second eccentric portion, respectively;
a plurality of rollers sandwiched between the outer gear portions of the two cycloidal gears and the inner gear ring of the second housing;
an output shaft connected to the two cycloidal gears, an axis of the output shaft overlapped with a center axis of the mounting portion;
an input gear coaxially mounted on the mounting portion;
a transmission gear received in the mounting portion, and meshing with the input gear and the gear portion of the first housing; and
a first transmission shaft rotatably connecting the transmission gear to the mounting portion.

2. The cycloidal pinwheel speed reducer of claim 1, wherein the mounting portion defines a first receiving hole along the center axis of the mounting portion, and defines a second receiving hole at an outer sidewall of the mounting portion, the first receiving hole communicates with the second receiving hole, the input gear is received in the first receiving hole, the transmission gear is received in the second receiving hole.

3. The cycloidal pinwheel speed reducer of claim 1, wherein the mounting portion defines a mounting hole along a direction parallel to the center axis of the mounting portion, the mounting hole communicates with the second receiving hole, the first transmission shaft is inserted into the mounting hole and the transmission gear, and opposite ends of the first transmission shaft are fixed within the mounting portion.

4. The cycloidal pinwheel speed reducer of claim 1, wherein the mounting frame further comprises a protruding portion, the protruding portion protrudes from the mounting portion towards the two cycloidal gears, the first eccentric portion and the second eccentric portion are located on an axial side of the protruding portion away from the mounting portion, the cycloidal pinwheel speed reducer further comprises a flange, the flange is sleeved on the protruding portion, and is located between the mounting portion and the two cycloidal gears.

5. The cycloidal pinwheel speed reducer of claim 4 further comprising a second transmission shaft, wherein the second transmission shaft is inserted into the two cycloidal gears, and opposite ends of the second transmission shaft are inserted into the flange and the output shaft.

6. The cycloidal pinwheel speed reducer of claim 5, wherein each of the two cycloidal gears defines a first fixing hole and a second fixing hole, a fixing portion protrudes from the output shaft, and is inserted into the first fixing hole, and is fixed to the flange, the second transmission shaft is inserted into the second fixing hole, and opposite ends of the second transmission shaft are inserted into the flange and the output shaft, respectively.

7. The cycloidal pinwheel speed reducer of claim 5 further comprising a needle roller bearing, wherein the needle roller bearing is sleeved on the first transmission shaft, and is received in the transmission gear.

8. The cycloidal pinwheel speed reducer of claim 1, wherein the input gear comprises a main body, a first gear portion and a second gear portion, the first gear portion and the second gear portion are connected to the main body, the second gear portion meshes with the transmission gear.

9. The cycloidal pinwheel speed reducer of claim 1 further comprising a cable receiving tube, wherein the cable receiving tube is inserted into the mounting frame, the two cycloidal gears, and the output shaft along the center axis of the mounting portion, and is fixed to the output shaft.

10. A cycloidal pinwheel speed reducer, comprising:
a first housing defining a gear portion at an inner wall thereof;
a second housing defining an inner gear ring at an inner sidewall thereof;
a mounting frame received in the first housing, and comprising a mounting portion, a first eccentric portion connected to the mounting portion, and a second eccentric portion connected to the first eccentric portion;
two cycloidal gears received in the second housing, and sleeved on the first eccentric portion and the second eccentric portion, respectively;
a plurality of rollers sandwiched between the two cycloidal gears and the second housing;
an output shaft connected to the two cycloidal gears;
an input gear coaxially mounted on the mounting portion;
a transmission gear received in the mounting portion, and meshing with the input gear and the gear portion of the first housing;
a first transmission shaft rotatably connecting the transmission gear to the mounting portion; and
a cable receiving tube inserted into the mounting frame, the two cycloidal gears, and the output shaft.

11. The cycloidal pinwheel speed reducer of claim 10, wherein the mounting portion defines a first receiving hole along the center axis of the mounting portion, and defines a second receiving hole at an outer sidewall of the mounting portion, the first receiving hole communicates with the second receiving hole, the input gear is received in the first receiving hole, the transmission gear is received in the second receiving hole.

12. The cycloidal pinwheel speed reducer of claim 10, wherein the mounting portion defines a mounting hole along a direction parallel to the center axis of the mounting portion, the mounting hole communicates with the second receiving hole, the first transmission shaft is inserted into the mounting hole and the transmission gear, and opposite ends of the first transmission shaft are fixed within the mounting portion.

13. The cycloidal pinwheel speed reducer of claim 10, wherein the mounting frame further comprises a protruding portion, the protruding portion protrudes from the mounting portion towards the two cycloidal gears, the first eccentric portion and the second eccentric portion are located on an axial side of the protruding portion away from the mounting portion, the cycloidal pinwheel speed reducer further comprises a flange, the flange is sleeved on the protruding portion, and is located between the mounting portion and the two cycloidal gears.

14. The cycloidal pinwheel speed reducer of claim 13 further comprising a second transmission shaft, wherein the second transmission shaft is inserted into the two cycloidal gears, and opposite ends of the second transmission shaft are inserted into the flange and the output shaft.

15. The cycloidal pinwheel speed reducer of claim 14, wherein each of the two cycloidal gears defines a first fixing hole and a second fixing hole, a fixing portion is protruded from the output shaft, and is inserted into the first fixing hole, and is fixed to the flange, the second transmission shaft is inserted into the second fixing hole, and opposite ends of the second transmission shaft are inserted into the flange and the output shaft, respectively.

16. The cycloidal pinwheel speed reducer of claim 14 further comprising a needle roller bearing, wherein the needle roller bearing is sleeved on the first transmission shaft, and is received in the transmission gear.

17. The cycloidal pinwheel speed reducer of claim 10, wherein the input gear comprises a main body, a first gear portion and a second gear portion, the first gear portion and the second gear portion are connected to the main body, the second gear portion meshes with the transmission gear.

\* \* \* \* \*